March 11, 1958 E. H. SCHUSTACK 2,826,435
SADDLE CLAMP WITH PRESSURE SEALED ANNULAR GASKET
Filed Feb. 2, 1953
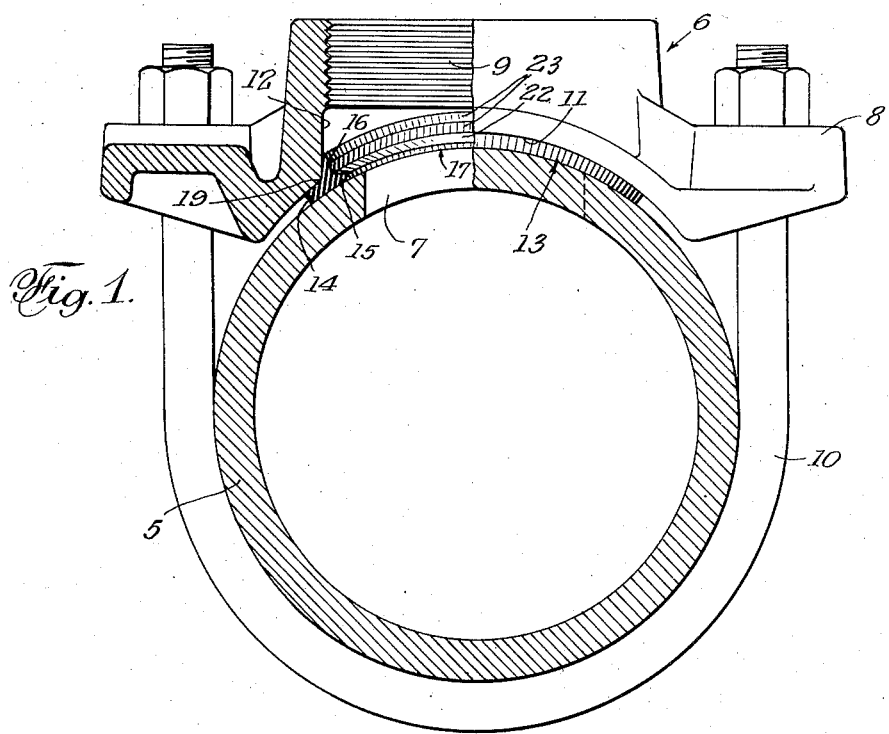
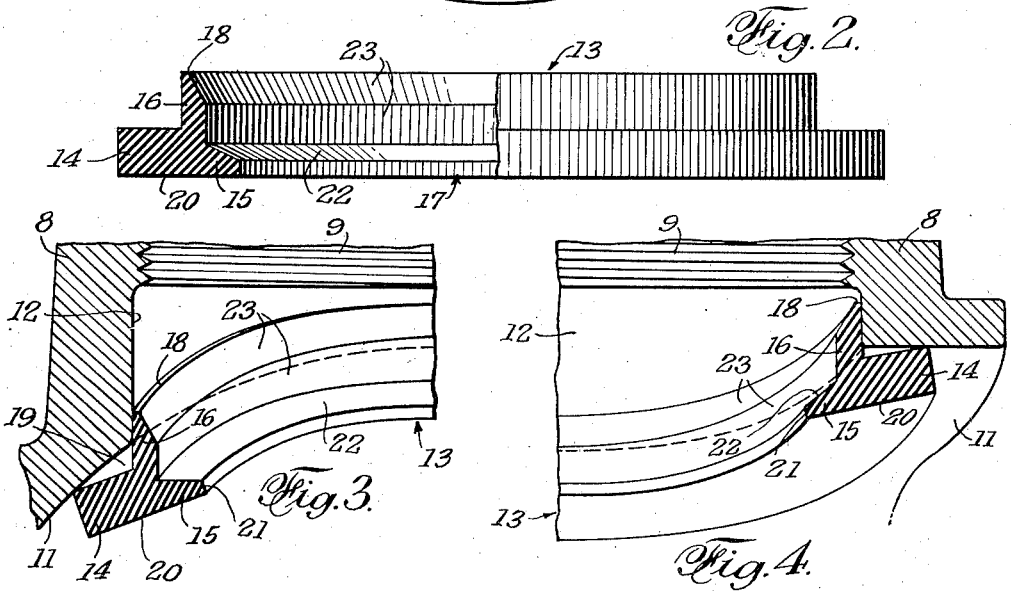
Inventor
EDWARD H. SCHUSTACK
By C. G. Stratton
Attorney United States Patent Office 2,826,435
Patented Mar. 11, 1958

2,826,435

SADDLE CLAMP WITH PRESSURE SEALED ANNULAR GASKET

Edward H. Schustack, Los Angeles, Calif.

Application February 2, 1953, Serial No. 334,419

4 Claims. (Cl. 285—110)

This invention relates to a saddle clamp structure and more particularly to the features thereof relating to the seal against a pipe to which said clamp is applied. The present invention is adapted for use in making service or branch connections with large pipes or mains that usually carry pressure fluid, either gaseous or liquid.

The usual method of making a service connection is to apply a service clamp on the main at the point where the connection is to be made; fitting a valve to said connection and to which the service or branch line is to be connected; opening said valve to afford a passage through which a drill is entered to cut a hole in the main; withdrawing the drill while closing the valve to hold the pressure in the main; and, finally, connecting the service line to the valve and opening the latter.

Various types of pipe are used as mains, some metallic and some non-metallic, such as cement-asbestos. It will be realized that the latter are not too resistant to compression forces as may be applied by an encircling clamp. Also, such connections are frequently made in excavations under difficult conditions, particularly as to space limitations.

Practice has shown, that the gasket used to seal between the main and the service clamp is the major factor in effecting a leak- and fool-proof seal against hydraulic or pneumatic pressure, as the case may be, in said main, and that a clamp that requires inordinately tight application in order to prevent "blowing" of the gasket, unduly strains the main (particularly a non-metallic main) and may crack or otherwise injure it.

Accordingly, it is an object of the present invention to provide a novel gasket construction for service clamps that obviates the above-mentioned faults in clamp application.

Another object of the invention is to provide a gasket construction that insures centralization of the gasket around the opening made in the main to, thereby, insure a "non-blowing" construction.

A further object of the invention is to provide a novel gasket of the character indicated, that is designed to utilize the hydraulic or pneumatic pressure of the main to effect improved sealing between the main and the clamp saddle.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention which is given by way of illustration or example only.

In the drawing, like reference characters designate similar parts in the several views.

Fig. 1 is a cross-sectional view through a main showing the present service clamp and sealing gasket applied thereto, the saddle of said clamp being shown half in elevation and half in cross-section.

Fig. 2 is an enlarged elevational view, in quarter section, of the gasket before application.

Fig. 3 is a fragmentary sectional view of the left side of the saddle and gasket before application to the main and to the scale of Fig. 2.

Fig. 4 is a similar sectional view taken at 90° to Fig. 3.

The main 5 is generally conventional and the clamp 6 is applied thereto so that said main may be provided with an opening 7 to pass the fluid in said main to a service connection made to the saddle 8 of clamp 6 as by screw threads 9. In the usual manner, the saddle 8 is clamped to the main by one or more U-bolts 10.

The saddle is formed with a concavely curved surface 11 conforming generally to the curvature of the main, and the passage in which threads 9 are provided, is enlarged at seat 12 where the same opens on surface 11. A gasket 13, according to the invention, is provided to seal between surface 11 and the main so that when opening 7 is formed, the pressure in the main is confined to passage only through the saddle passage. Said gasket is made of molded resilient rubber, either natural or synthetic, as desired.

The gasket that is illustrated is of circular form and its relaxed cross-section, as best seen in Fig. 2, comprises a main annular outer flange 14, a generally thinner and inwardly tapered annular inner flange 15, and a similarly thin and tapered flange collar 16 that extends transversely from where flanges 14 and 15 join.

The gasket, thus, has a cross-sectional form that may be described as a modified T in which the head or cross bar comprises flange 14 on one side and the thinner tapered flange 15 on the other side, and the leg comprises flange collar 16.

The outer diameter of the flange collar 16 is formed to snugly fit seat 12 with flange 14 disposed against or adjacent to saddle surface 11 and flange 15 extending inwardly and, according to its size, constricting the diametral size of seat 12 to the diametral opening 17 of the gasket.

From its initially flat condition of Fig. 2, when the opposite sides of the gasket are flexed so that the gasket has the curvature of surface 11, the outer annular edge 18 of flange 16 assumes an elliptic form in which the major axis is in the direction of said curvature. This elliptic form results from an outward pull on edge 18 at two opposite points and a resultant inward pull on said edge at two opposite points 90° away from the first two spaced points. Accordingly, when the gasket is applied to the saddle and assumes the general curvature of surface 11, the increased distance across the first two opposed points entails an inward flexing of said points to enable their insertion into seat 12. This is shown by the obtuse angle 19 that is formed between flange 14 and collar 16. Consequently, flange collar 16, at said two opposite points and to a successively lesser degree on both sides of said two points in both directions toward the opposite points on the minor axis, firmly frictionally grips the wall of seat 12 and insures retention of the gasket in the seat while the saddle is being applied to the main. Said flange collar, therefore, serves the function of facilitating central disposition of the gasket relative to seat 12.

While flange collar 16, when flexed as described, forms an ellipse having its major axis along the curvature of surface 11, flanges 14 and 15 assume an elliptic form in which the major axis is transverse to the first-mentioned major axis and, in the process of being flexed, the annular surface 20 of the gasket loses its initially flat condition. At the first two opposite points of the gasket (Fig. 3), the opposite surface portions 20 define a downwardly facing obtuse angle which is substantially flatter than the curvature of surface 11, while the opposite surface portion 90° away (Fig. 4), defines an upwardly facing obtuse angle.

Therefore, it will be seen from Figs. 3 and 4 that, as the saddle 8 with the gasket 13 pressed into seat 12, is applied to main 5, the inner edge 21 of tapered flange 15 encounters said main first. Then, as the saddle is drawn into place by bolts 10, said flange 15 and flange 14 are flexed to conform to the curvatures of the main and saddle surface 11, as shown in Fig. 1. It follows, then, that there is a sure and intimate contact of flange 15 with the main although only flange 14 is clamped between main and saddle. During such clamping, angle 19 between flange 14 and collar 16 increases, placing the latter under greater flexion and, thereby insuring intimate engagement of said collar and the cylindrical wall of seat 12.

It follows from the above that flange 14 need not be unduly compressed to insure against leakage, but only compressed to a degree sufficient to hold the gasket firmly in place, since the hydraulic or pneumatic pressure in the main can manifest itself only on the sloping surface 22 of flange 15 and surfaces 23 of flange collar 16 to more firmly press said flange and collar into sealing engagement with the main and the saddle seat, respectively.

The gasket thus provided has a collar flange 16 having an outer cylindrical wall or face and an annular inner face 23 that, with said cylindrical wall, defines a wedge-sectioned portion. The clamp flange 14 is outward of and normal to the collar flange 16 and has parallel faces. The sealing flange 15 is inward of the clamp flange and has a sealing surface that is a planar extension of the main-engaging surface of the outer flange and a conical surface 22 that, together with said sealing surface, defines a wedge-sectioned portion.

Not only can the crushing force on the main be reduced but the saddle 8 and bolts 10 can be made lighter and, therefore, less expensive.

While I have illustrated and described what I now contemplate to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. In a service clamp for a main having fluid pressure therein, said clamp including a saddle having a concavely curved surface that is generally parallel to the outer curvature of the main, and said clamp having a seat defined by a cylindrical wall and opening on said concave surface, the improvement that comprises an initially circular sealing gasket of resilient material that is provided with an annular flange collar having an outer cylindrical wall adapted to enter and fit the mentioned cylindrical wall of the seat in the saddle, said collar having an inner cylindrical wall terminating in a conical surface that cooperates with the outer cylindrical wall to provide said flange collar with a wedge-sectioned annular part, an outer annular flange normal to the flange collar and adapted to be disposed between the main and the concave surface of the saddle when the flange collar is engaged in the mentioned seat and the saddle is placed in operative association with the main, and an inner annular flange that is normal to said flange collar and has a surface adapted to seal against the outer surface of the main and is a planar extension of the main-engaging surface of the outer flange, said inner flange having a conical surface that cooperates with said sealing surface to provide said inner flange with a wedge-sectioned form, the conical surfaces of the annular flange collar and of the inner flange both facing into said seat and subject to pressure in said seat, said collar and the latter flange being pressed thereby into firm sealing contact, respectively, with the concave surface of the seat and the outer surface of the main.

2. In a service clamp according to claim 1, the outer flange being substantially thicker than the flange collar and inner flange.

3. In a service clamp according to claim 1, the gasket being conformed, when clamped between the main and the saddle, to the outer curvature of the former, the flange collar retaining its normal relationship with the outer and inner flanges where the same is engaged with the normal intersection between the mentioned seat wall and concave surface of the saddle, and the flange collar being deflected from its normal relationship with said outer and inner flanges where the same is engaged in ninety-degree phased relationship with the saddle and where the seat wall and concave surface include an obtuse angle.

4. In a service clamp according to claim 2, the gasket being conformed, when clamped between the main and the saddle, to the outer curvature of the former, the flange collar retaining its normal relationship with the outer and inner flanges where the same is engaged with the normal intersection between the mentioned seat wall and concave surface of the saddle, and the flange collar being deflected from its normal relationship with said outer and inner flanges where the same is engaged in ninety-degree phased relationship with the saddle and where the seat wall and concave surface include an obtuse angle.

References Cited in the file of this patent

UNITED STATES PATENTS

| Number | Name | Date |
| --- | --- | --- |
| 218,894 | Morrison et al. | Aug. 26, 1879 |
| 998,926 | Sheehan | July 26, 1911 |
| 1,671,299 | Lippert | May 29, 1928 |
| 2,027,653 | Roye | Jan. 14, 1936 |
| 2,443,145 | Payne | June 8, 1948 |
| 2,467,061 | Mason | Apr. 12, 1949 |
| 2,561,884 | Perrow | July 24, 1951 |
| 2,705,158 | Risley | Mar. 29, 1955 |
| 2,709,092 | Wallace | May 24, 1955 |

FOREIGN PATENTS

| Number | Country | Date |
| --- | --- | --- |
| 268,923 | Great Britain | Apr. 14, 1927 |